(12) United States Patent
Oztaskent

(10) Patent No.: US 9,723,336 B1
(45) Date of Patent: *Aug. 1, 2017

(54) TELEVISION ADVERTISEMENT REACH AND FREQUENCY MANAGEMENT

(75) Inventor: Ant Oztaskent, Sutton (GB)

(73) Assignee: Google Inc., Mountain View, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/620,201

(22) Filed: Sep. 14, 2012

Related U.S. Application Data

(63) Continuation of application No. 13/309,367, filed on Dec. 1, 2011, now Pat. No. 8,352,981.

(51) Int. Cl.
*H04N 7/10* (2006.01)
*H04N 21/234* (2011.01)

(52) U.S. Cl.
CPC .................. *H04N 21/23424* (2013.01)

(58) Field of Classification Search
CPC .......... H04N 21/23424; H04N 5/2723; G06Q 30/0264; G06Q 30/0266
USPC ................ 725/32, 34–36; 705/14.4–14.73
See application file for complete search history.

(56) References Cited

U.S. PATENT DOCUMENTS

| | | | |
|---|---|---|---|
| 5,966,696 A | 10/1999 | Giraud | |
| 7,853,969 B2 | 12/2010 | Smith et al. | |
| 7,895,076 B2 | 2/2011 | Kutaragi et al. | |
| 2002/0083439 A1 | 6/2002 | Eldering | |
| 2002/0083443 A1 | 6/2002 | Eldering et al. | |
| 2002/0178447 A1 | 11/2002 | Plotnick et al. | |
| 2002/0184047 A1 | 12/2002 | Plotnick et al. | |
| 2003/0074252 A1 | 4/2003 | Chandler-Pepelnjak et al. | |
| 2003/0163370 A1 | 8/2003 | Chen et al. | |
| 2004/0216157 A1 | 10/2004 | Shain et al. | |
| 2005/0210502 A1 | 9/2005 | Flickinger et al. | |
| 2006/0059277 A1 | 3/2006 | Zito et al. | |
| 2007/0016918 A1 | 1/2007 | Alcorn et al. | |
| 2007/0055985 A1 | 3/2007 | Schiller et al. | |
| 2007/0079326 A1 | 4/2007 | Datta et al. | |
| 2007/0219859 A1 | 9/2007 | Huntington | |
| 2007/0220545 A1 | 9/2007 | Awano | |
| 2007/0266400 A1 | 11/2007 | Rogers et al. | |
| 2008/0133342 A1 | 6/2008 | Criou et al. | |
| 2008/0263578 A1 | 10/2008 | Bayer et al. | |
| 2008/0276270 A1 | 11/2008 | Kotaru et al. | |

(Continued)

FOREIGN PATENT DOCUMENTS

| | | |
|---|---|---|
| WO | WO2006026736 A2 | 3/2006 |
| WO | WO2006127470 A2 | 11/2006 |

*Primary Examiner* — Farzana Hossain
(74) *Attorney, Agent, or Firm* — Fish & Richardson P.C.

(57) ABSTRACT

The subject matter of this specification can be embodied in, among other things, a method that includes receiving at a television processing device an airing schedule for a specified advertisement. The airing schedule includes data specifying past airings of the specified advertisement, a local frequency at which the specified advertisement is to be shown, and a schedule of airings of replaceable advertisements. The device determines, from viewing log data, whether the local frequency for the specified advertisement has been achieved. If the local frequency has not been achieved, the specified advertisement is aired in place of a replaceable advertisement when the television processing device is tuned to a channel of a scheduled airing of the replaceable advertisement at a time of the scheduled airing, and the local frequency of the specified advertisement is incremented. Otherwise, the replaceable advertisement is presented.

14 Claims, 5 Drawing Sheets

(56) References Cited

U.S. PATENT DOCUMENTS

| | | |
|---|---|---|
| 2008/0300965 A1 | 12/2008 | Doe |
| 2009/0077579 A1 | 3/2009 | Li et al. |
| 2009/0099904 A1 | 4/2009 | Affeld et al. |
| 2009/0150198 A1 | 6/2009 | Volovich et al. |
| 2009/0259518 A1 | 10/2009 | Harvey et al. |
| 2009/0320060 A1 | 12/2009 | Barrett |
| 2010/0088714 A1 | 4/2010 | Hawkins et al. |
| 2010/0088719 A1 | 4/2010 | Hawkins et al. |
| 2010/0146531 A1 | 6/2010 | Fu et al. |
| 2011/0153418 A1 | 6/2011 | Quine et al. |
| 2012/0079518 A1 | 3/2012 | Wan et al. |

TELEVISION ADVERTISEMENT REACH AND FREQUENCY MANAGEMENT

CROSS REFERENCE TO RELATED APPLICATION

This application is a continuation application of, and claims priority to, U.S. patent application Ser. No. 13/309,367, entitled "Television Advertisement Reach And Frequency Management," which was filed on Dec. 1, 2011. The disclosure of which is incorporated herein by reference in its entirety.

TECHNICAL FIELD

This instant specification relates to the distribution of television advertisements.

BACKGROUND

Television advertising is one of the most prevalent advertising strategies in use today. Each television advertising campaign may have different strategies, such as brand recognition lift, increasing sales, and the like. However, regardless of the strategy, television advertisers must rely on viewers, who are potential customers, remembering their advertisement or brand when shopping.

Television advertisers generally identify target demographic groups, and attempt to formulate a television advertising campaign that will cause the given advertisement to reach individual members of the target demographic groups a predetermined number of times. The number of unique audience members that view a particular advertisement is referred to as "reach," and the number of times each unique member views the particular advertisement is referred to as "frequency."

Advertisers often have reach and frequency goals. For example, an advertiser may desire to reach 10,000 unique viewers, and may desire to have each viewer view the advertisement three times. Thus, the reach goal is 10,000, and the frequency goal is three (averaged). One technique for achieving these goals is to broadcast the advertisement on multiple channels and at multiple times. However, this technique may lead to achieving reach and frequency values that are in excess of the advertiser's goal. As the advertiser pays for each impression, the advertiser's return on investment is reduced. Similarly, in cases where the advertisement reaches an individual too few times, the viewer may not remember the advertisement sufficiently well enough for the advertising campaign to be effective.

SUMMARY

In general, this document describes technologies relating to systems and methods for the distribution of advertisements through Internet television devices and television advertisement broadcasts.

In general, one innovative aspect of the subject matter described in this specification can be embodied in methods that include the actions of receiving, at a television processing device, an airing schedule for a specified advertisement defined by multimedia data, wherein the airing schedule includes data specifying: past airings of the specified advertisement, each past airing specifying a channel and a time of the past airing, a local frequency at which the specified advertisement is to be shown by use of the television processing device, the local frequency being inclusive of the past airings, and a schedule of airings of replaceable advertisements, each airing specifying a channel and a time of the airing; determining from the airing schedule and from viewing log data for the television processing device, wherein the viewing log data describes channel tunes to channels and the time for each channel tune, whether the local frequency for the specified advertisement has been achieved; in response to determining that the local frequency for the specified advertisement has not been achieved: processing the specified advertisement for airing in place of a replaceable advertisement when the television processing device is tuned to a channel of a scheduled airing of the replaceable advertisement at a time of the scheduled airing, and incrementing the local frequency of the specified advertisement; and in response to determining that the local frequency for the specified advertisement has been achieved, processing the replaceable advertisement for airing when the television processing device is tuned to the channel of the scheduled airing of the replaceable advertisement at the time of the scheduled airing. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving an advertisement presentation schedule for presentation of a specified advertisement; receiving, by the computer device, a replaceable advertisement schedule descriptive of the timing of one or more broadcast advertisements available for replacement by the specified advertisement during the presentation of one or more television broadcasts, the television broadcasts including program content portions and one or more advertising content portions; identifying, by the computer device, the broadcast advertisements presented as the advertising content portions; determining, by the computer device, an airing schedule descriptive of the timing, frequency, and channels with which the specified advertisement has been included in the television broadcasts; providing, by the computer device to a television processing device: the advertisement presentation schedule, the specified advertisement; and the replaceable advertisement schedule. Other embodiments of this aspect include corresponding systems, apparatus, and computer programs, configured to perform the actions of the methods, encoded on computer storage devices.

The systems and techniques described here may provide one or more of the following advantages. First, a system can increase the effectiveness of an advertising campaign by showing specified advertisements to identified individuals a predetermined number of times as they watch television, thereby facilitating the achievement of reach and frequency goals. Second, the system can reduce the advertising costs associated with an effective increase the reach and frequency of television advertisements for members of identified demographic groups. Third, frequency calculations can be made entirely within a set-top box without sharing the view logs. Thus, the privacy of viewers can be protected while at the same time advertisers can achieve granular frequency and reach goals, i.e., the reach and frequency of a particular advertisement can be managed without exposure of individual viewing habits.

The details of one or more implementations are set forth in the accompanying drawings and the description below. Other features and advantages will be apparent from the description and drawings, and from the claims.

DETAILED DESCRIPTION

This document describes systems and techniques for targeting the presentation of television advertisements (e.g., commercials) such that individual members of targeted demographic groups are shown specified advertisements approximately a predetermined number of times. In general, "reach" (e.g., how many people see an ad) and "frequency" (e.g., how many times the ad is seen by one viewer) is very important to television advertisers. Advertisers generally want to increase both of these, especially reach, with little incremental cost. However, in some broadcast mediums, the reach vs. spend curve can be logarithmic (e.g., spending twice may not increase the reach two-fold).

This can be further complicated when advertisers use multiple advertisement channels. For example, advertisers may place some of their ads directly with the broadcaster, some of them with local affiliates of national broadcasters, and some of them with the cable or satellite operator, and some of them with other systems. In some implementations, a single ad pod (e.g., a period during a television broadcast in which multiple advertisements are shown sequentially) typically carries ads from all of these. For example, ads in the first four minutes of a pod may be ads placed directly with the national broadcaster (e.g. NBC), the next two minutes of a pod may be ads placed with the local affiliate (e.g. KNBC), and the next two minutes may be placed with the operator (e.g. Dish Network).

In general, the systems and methods herein are used to increase the likelihood that a specified advertisement is shown to as many different viewers in the advertiser's desired demographic as possible, and to reduce the likelihood that the same viewer is not shown the same advertisement more than the advertiser's desired frequency.

In some implementations, these goals are achieved by determining the number of times an identified viewer has already seen a specified advertisement. If the viewer has not seen the specified advertisement at least a predetermined number of times, the viewer is shown the specified advertisement again during a portion of a television broadcast that is scheduled to show a broadcast advertisement that can be replaced by the specified advertisement. If the viewer has seen the specified advertisement at least a predetermined number of times, then specified advertisement is not used to replace a broadcast advertisement and therefore not incur the incremental cost associated with presenting the specified advertisement to the viewer.

Figure 1:
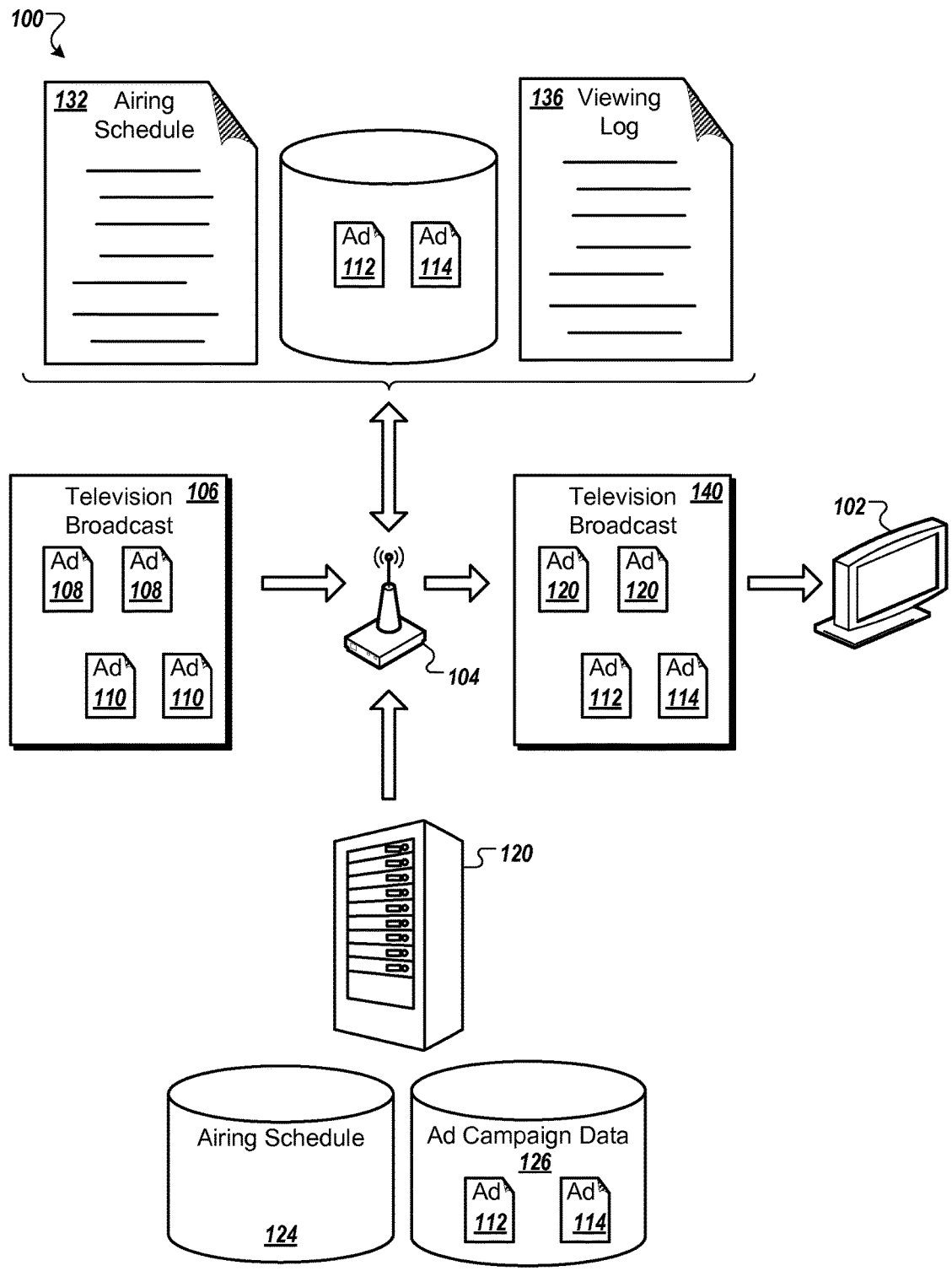
FIG. 1 is a block diagram that shows an example environment in which television advertisements are shown according to reach and frequency management techniques.

FIG. 1 is a block diagram that shows an example environment 100 in which television advertisements are shown according to reach and frequency management techniques. Relevant content items, e.g., television advertisements, are delivered to viewers to facilitate operator monetization of programming and quantification of advertisement delivery to target markets. The television advertisement can be shown separately from a television program in the form of a television commercial, or can be shown concurrently with a television program in the form of an overlay or text stream on a portion of a television display.

In general, the task of delivering television advertisements to a specified user is performed by a processor and supporting devices either built into a display device 102 or included in a television processing device 104 connected to the television, such as a set top box (STB), an external tuner, a digital video recorder (DVR), cable tuner, satellite tuner, video game console, or any other appropriate device that can process and modify television broadcast signals.

A television broadcast 106 includes program content portions (e.g., sponsored television programs) and advertisement content portions (e.g., television advertisements). For example, the television broadcast 106 includes a collection of non-replaceable advertisements 108 and a collection of replaceable advertisements 110. In some implementations, the replaceable advertisements 110 are television commercials that are scheduled for broadcast, but can be replaced by other commercials. For example, the replaceable advertisements 110 can be included in the television broadcast 106 by a national television network broadcaster, but are available to be overridden to show advertisements provided by a local affiliate, cable provider, or satellite provider.

The television processing device 104 identifies the replaceable advertisements 110 and determines if one of more of the replaceable advertisements 110 should be replaced by one or more specified advertisements 112 and 114. This determination is made on the viewing history derived from logs of the television processing device 104 and frequency parameters. Details of the process for identifying and replacing the replaceable advertisements 110 is discussed in additional detail below.

If a replacement is decided to be made, then the television broadcast 106 is modified to include one or more of the specified advertisements 112 and 114, provided for display by the display device 102. If a replacement is decided not to be made, then the television broadcast 106 is shown with the replaceable advertisements.

A server computer device 120 includes an airing schedule repository 124 and an advertising campaign data repository 126. In some implementations, the repositories 124 and 126 can be one or more databases, database tables, electronic lists, electronic files, or any other appropriate format or device that can store electronic data.

The airing schedule repository 124 is a collection of data that describes the past and future scheduled airings of one or more identified advertisements across television channels. In some implementations, the data in the airing schedule repository 124 may be received from an advertiser or advertising agency. In some implementations, the data in the airing schedule repository 124 may be limited to a predefined time range. For example, the data in the airing schedule repository 124 may include information describing the past month's airings of the identified advertisements, and/or the next two months' scheduled airings of the identified advertisements.

The airing schedule repository 124 also includes data that describes how often and, optionally, to which demographic segments the specified advertisements 112-114 are to be presented. In some implementations, the collection of data included in the airing schedule repository 124 can be received from advertisers or marketers. In some implementations, the airing schedule 124 can include demographic information that describes the people (e.g., geographic location, age range, gender, expressed interests, inferred interests) to whom an advertiser wishes to target specified advertisements. For example, the specified advertisement 112 can be a commercial promoting special airline fares for the "North East Regional Airlines" company, and the airing schedule repository 124 can specify that "North East Regional Airlines" has targeted viewers aged 30-65 and living in the New England region to be shown the specified advertisement 112 three, five, ten, or any other appropriate number of times.

The advertising campaign data repository 126 is a collection of data that describes specified advertisements that can be used to replace the replaceable advertisements 110. The advertising campaign data repository 126 includes the specified advertisement 112 and the specified advertisement 114. In some implementations, the specified advertisements 112-114 can be multimedia files. For example, the specified advertisements 112-114 can be digital video recordings of television commercials, the digital video recordings being stored in an electronic format capable of being decoded and played back by the television processing device 104.

In some implementations, the specified advertisements and an airing schedule 132 are provided to each television processing device 104 and stored. In other implementations, the server computer device 120 identifies television processing device 104 of users that meet a demographic segment requirement specified for a specified advertisement, and provides the specified advertisements to only those identified television processing devices 104. For example, the television processing device 104 may be associated with one or more user accounts for viewers who watch the display device 102. The server computer device 120 identifies demographic information associated with the users of the television processing device 104, and based on that information provides an airing schedule 132 and the specified advertisements 112 and 114 to the television processing device 104. The specified advertisements 112 and 114 may be stored at the television processing device 104 in an advertisement campaign data repository 134.

The airing schedule 132 describes the times and channels at which the specified advertisements 112 and 114 have been broadcast, and information about the times and channels of future airings of the replaceable advertisements 110. The airing schedule 132 also includes information that describes the desired frequency associated with pairings of users and specified advertisements. For example, the airing schedule 132 may describe that the user of the television processing device 104 is to be shown the specified advertisement 112 four times, and is to be shown the specified advertisement 114 six times.

The television processing device 104 also includes a viewing log 136. The viewing log 136 is a collection of information that describes a history of the times, channels, and/or networks to which the television processing device 104 has been tuned. In some implementations, the viewing log 136 can also include user information. For example, the viewing log 136 may include information describing that a first user was watching the "Sports Channel" from 10 am to 1 pm, and that a second user was watching the "News Network" from 2 pm to 4 pm. Frequency determinations can thus be made with respect to each user. In some implementations, the user information is stored only if users expressly opt-in to have user specific information stored. Should the television processing device 104 have the capability to report the viewing logs 136 (e.g., to a network provider), then the viewing logs 136 are anonymized to remove the user specific information. Additional anonymization techniques to protect viewer privacy can also be implemented.

The television processing device 104 compares the information in the airing schedule 132 the information in the viewing log 136 to determine the number of times the specified advertisements 112-114 have already been shown to the current user of the television processing device 104. For example, the viewing log 136 may indicate that the television processing device 104 was tuned the previous day to channel A from 9 pm to 10 pm, and tuned to channel B from 10 pm to 11 pm. The airing schedule 132 may indicate that the specified advertisement 112 was shown two times on channel A between 9 pm and 10 pm, and once on channel B between 10 pm and 11 pm. Thus, in this example, the viewing log 136 and the airing schedule 132 may be compared to determine that the user has been shown the specified advertisement 112 three times.

Based on the difference between the determined number of times the user has already seen the specified advertisements 112 and 114, and the number of times the user is intended to see the specified advertisements 112 and 114, the television processing device 104 determines the number of remaining times the user is to be shown the specified advertisements 112 and 114. For example, the airing schedule 132 may indicate that the user is to see the specified advertisement 112 four times, and the information from the airing schedule 132 and the viewing log 136 can be compared to determine that the user has already seen the specified advertisement 112 three times. Thus, in this example, the television processing device 104 determines that the user is to be shown the specified advertisement 112 one additional time in order to achieve the intended frequency.

To achieve the intended frequency, the television processing device 104 may identify one or more of the replaceable advertisements 110 and replace one or more of the replaceable advertisements 110 with one or more of the specified advertisements 112 and 114. The airing schedule 132 may include information that describes the channels and future times when replaceable advertisements are scheduled to be broadcast. For example, the user may be tuned to the "Chef Channel", and the television processing device 104 may consult the airing schedule 132 to determine that one of the replaceable advertisements 110 will be broadcast on the "Chef Channel" in approximately 20 seconds, and another will be broadcast in approximately 50 seconds.

If the television processing device 104 determines that the user has not yet been shown one or more of the specified advertisements 112 and 114 the intended number of times, the television processing device 104 may replace the replaceable advertisements 110 in the television broadcast 106 with the specified advertisements 112 and 114 to form a modified television broadcast 140, and provides the modified television broadcast 140 to the display device 102.

Figure 2:
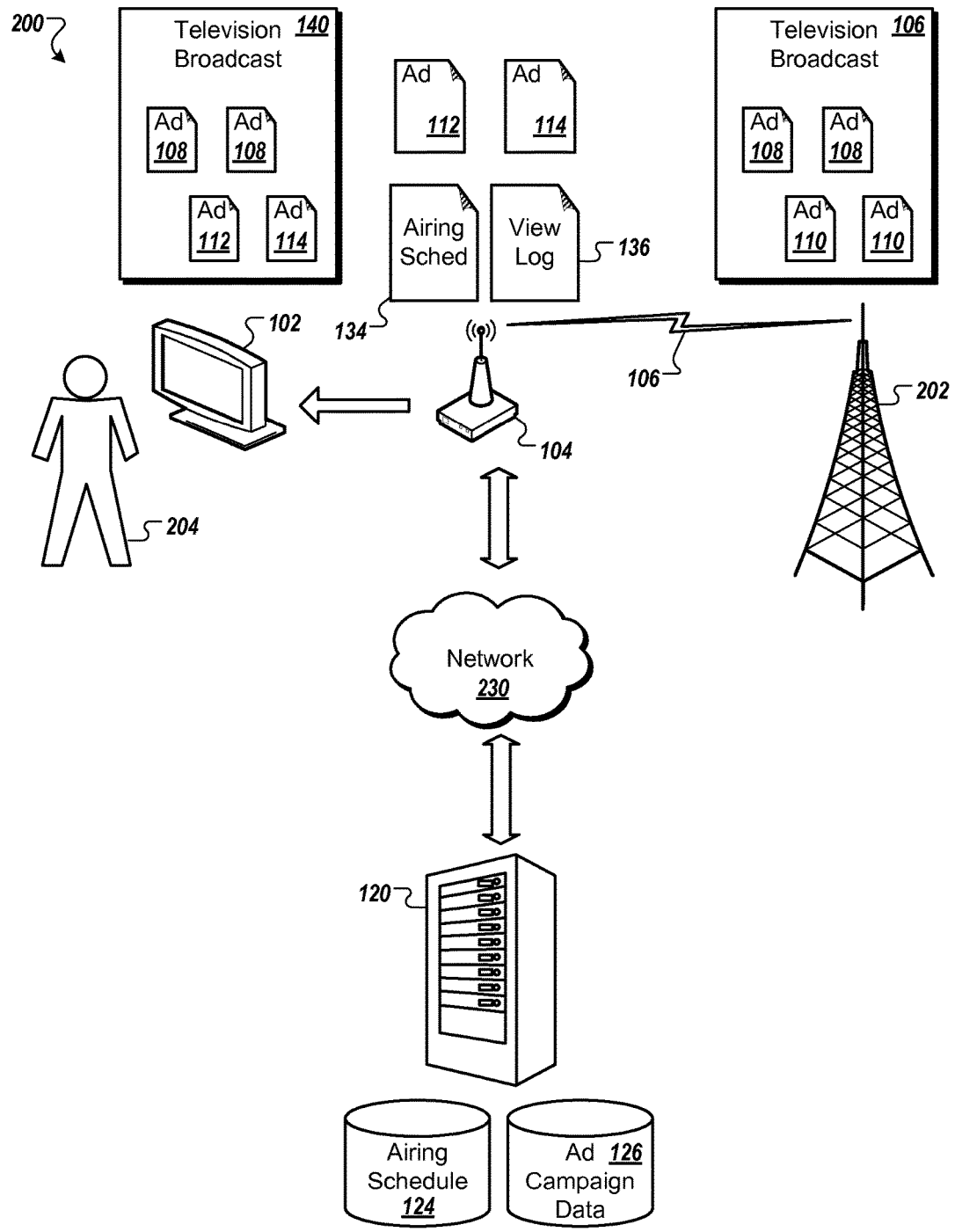
FIG. 2 is a block diagram that shows system features for managing reach and frequency of television advertisements.

FIG. 2 is a block diagram that shows system features of a system 200 for managing reach and frequency of television advertisements. The television processing device 104 receives the television broadcast 106 (e.g., television programming, the non-replaceable advertisements 108, and the replaceable advertisements 110) from a broadcaster 202. In some implementations, the broadcaster 202 can be a terrestrial broadcaster, a cable television provider, a satellite television provider, an Internet protocol television (IPTV) provider, or any other appropriate source of the television broadcast 106. The broadcaster 202 may be any system capable of providing the television broadcast 106 to the television processing device 104 for display to a user 204. In some cases, the broadcast may include other types of media broadcast including, for example, radio broadcasts, media broadcasts, or combinations of these.

The television processing device 104 may process the television broadcast 106 for display by the display device 102 (e.g., a television). In some implementations, the television processing device 104 can be a stand-alone device (e.g., a "set-top" box) in communication with the display device 102. In some implementations, the television processing device 104 may receive the television programming content from a source other than the broadcaster 202. For example, a channel tuning device (e.g., cable box, satellite receiver) can provide the television content to the television processing device 104. In another example, television processing device 104 can receive the television or other video content from a video playback device (e.g., digital video recorder, streaming video receiver). In some implementations, the television processing device 104 can include channel tuning or content playback functions. In some implementations, the television processing device 104 can be integrated as part of the display device 102.

The television processing device 104 receives the airing schedule 134 and the specified advertisements 112 and 114 from the server computer system 120 through a network 230 (e.g., a wireless or wired public network, such as the Internet, or over the television broadcast network). Based on this information, and information stored in the viewing log 136, the television processing device 104 can determine if the specified advertisements 112 and 114 have been shown to the user 204 less than a predetermined number of times, and if so, replace the replaceable advertisements 110 with the specified advertisements 112 and 114 in the modified television broadcast 140.

In some implementations, the viewing log 136 is stored by the television processing device 104 and not provided to any external system or person. For example, the viewing log 136 may contain information that the user considers to be private (e.g., the user's identity, the programs or channels the user has watched), and in order to protect the user's private information, the viewing log 136 may not be provided or used beyond the television processing device 104.

In some implementations, viewership information, but not the complete viewing log 136 may be provided to the server computer device 120. For example, the television processing device 104 may process the viewing log 136 to reduce the information it includes down to a collection of information that only describes the number of times the specific advertisements have been presented to users by the television processing device 104, and provide that viewership information to the server computer device 120. In such an example, the server computer device 120 may track, and thus charge advertisers appropriately for, the presentation of the specified advertisements 112 and 114 without needing to collect any private information (e.g., the channels the advertisements were viewed on, the shows during which they were viewed, the identities of who viewed them).

In some implementations, television processing device 104 can receive the specified advertisements 112 and 114 from sources other than the server computer system 120. For example, the television processing device 104 can receive the specified advertisements 112 and 114 from the broadcaster 202 through a subchannel, sideband, or multiplexed signal provided along with the television broadcast 106. In some implementations, the television processing device 104 can record one or more of the broadcast advertisements 108, 110, and play them back later at the specified advertisements 112 and 114.

In some implementations, the communications with the server computer device 120 can be very lightweight. For example, the airing schedule 132 may be a text or extensible markup language (XML) file of only a few hundred or a few thousand bytes, and as such would consume little bandwidth on the network 240. In some implementations, the network 230 can be a dial-up network. For example, the television processing device 104 may include a modem, and may be configured to periodically establish a dial-up connection with the server computer device 120 to receive the airing schedule 132.

In some implementations, the specified advertisements 112 and 114 may be provided to the television processing device 104 dynamically. For example, the television processing device 104 may determine that one of the replaceable advertisements 110 is to be replaced by the specified advertisement 112. In response to this determination, the television processing device 104 may request the server computer device 120 to provide (e.g., stream) the specified advertisement 104, such that the specified advertisement 112 can replace the selected replaceable advertisement 110 in the modified television broadcast 140.

In some implementations in which two or more of the television processing devices 104 are used, the specified advertisements 112 and 114 may be provided to a first television processing device 104, which in turn provides the specified advertisements 112 and 114 to a second television processing device 104. For example, bandwidth on the network 230 may be reduced by sending the specified advertisement 112 from the server computer device 120 to the first television processing device 104, and the first television processing device 104 can share the specified advertisement 112 with the second television processing device 104 (e.g., over a local area network connecting the two television processing devices 104).

Figure 3:
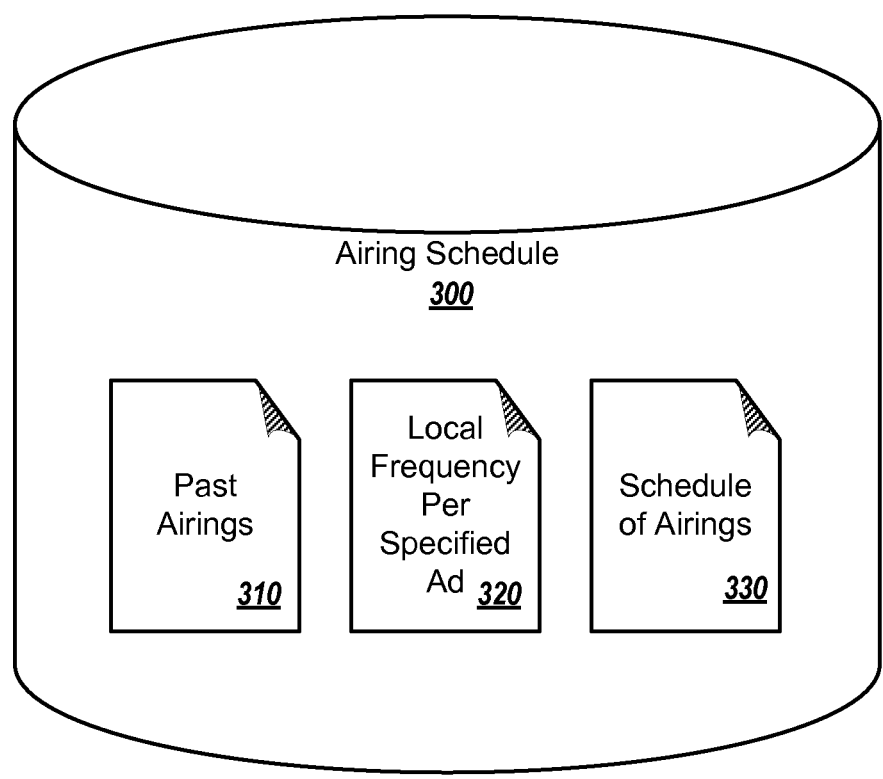
FIG. 3 is a block diagram of a television advertisement airing schedule.

FIG. 3 is a block diagram of a television advertisement airing schedule repository 300. In some implementations, the airing schedule repository 300 can be the airing schedule repository 124 or the airing schedule 132 of FIGS. 1 and 2. The airing schedule includes a collection of past airings data 310. The collection of past airings data 310 specifies of one or more specified advertisements as well as the channels and times of the past airings. For example, the collection of past airings data 310 can identify the specified advertisement 114 and include information stating that the specified advertisement 114 was shown two days ago at 3:34 pm on channel 123, was shown yesterday at 8:45 am on channels 234 and 345, and shown again yesterday at 11:30 am on channel 456.

The airing schedule also includes a collection of local frequency data per specified advertisement 320. The collection of local frequency data per specified advertisement 320 includes information about the frequency at which a specified advertisement is to be shown by use of a television processing device. For example, the collection of local frequency data per specified advertisement 320 can specify that the user 204 of FIG. 2 is to be shown the specified advertisement 114 five times. The local frequency may be inclusive of the past airings. For example, the television processing device 104, when determining the frequency at which the user 204 is to be shown the specified advertisement 114, will compare the viewing log 136 to the collection of past airings data 310 to determine the number of times the user 204 has already seen the specified advertisement 114. This determined number of previous viewings may be taken into account when determining how many more times the specified advertisement 114 is to be shown to the user 204 in order to achieve the frequency specified by the collection of local frequency data per specified advertisement 320.

The airing schedule may also include a schedule of airings of replaceable advertisements 330. The schedule of airings of replaceable advertisements 330 may include information about the airings of specified advertisements, each airing specifying a channel and a time of the airing. For example, the schedule of airings of replaceable advertisements 330 can indicate that the replaceable advertisements 110 will be shown later today on channel 123 at 3:52 pm and 3:53 pm, later today on channel 234 at 6:00 pm, and tomorrow on channel 345 at 9:10 am.

In some implementations, the schedule of airings of replaceable advertisements 330 can be used to schedule the presentation of specified advertisements during the broadcast of replaceable advertisements. For example, the user 204 may be watching the television broadcast 106, and the television processing device 104 may determine that the user 204 is to be shown the specified advertisement 114 at least one more time in order to achieve the frequency described by the collection of local frequency data per specified advertisement 320. In response, the television processing device 104 can determine that one of the replaceable advertisements 110 is scheduled to be shown during the television broadcast 106, and modify the television broadcast 106 by replacing one of the replaceable advertisements 110 with the specified advertisement 114, and present the specified advertisement 114 to the user as part of the modified television broadcast 140.

Figure 4:
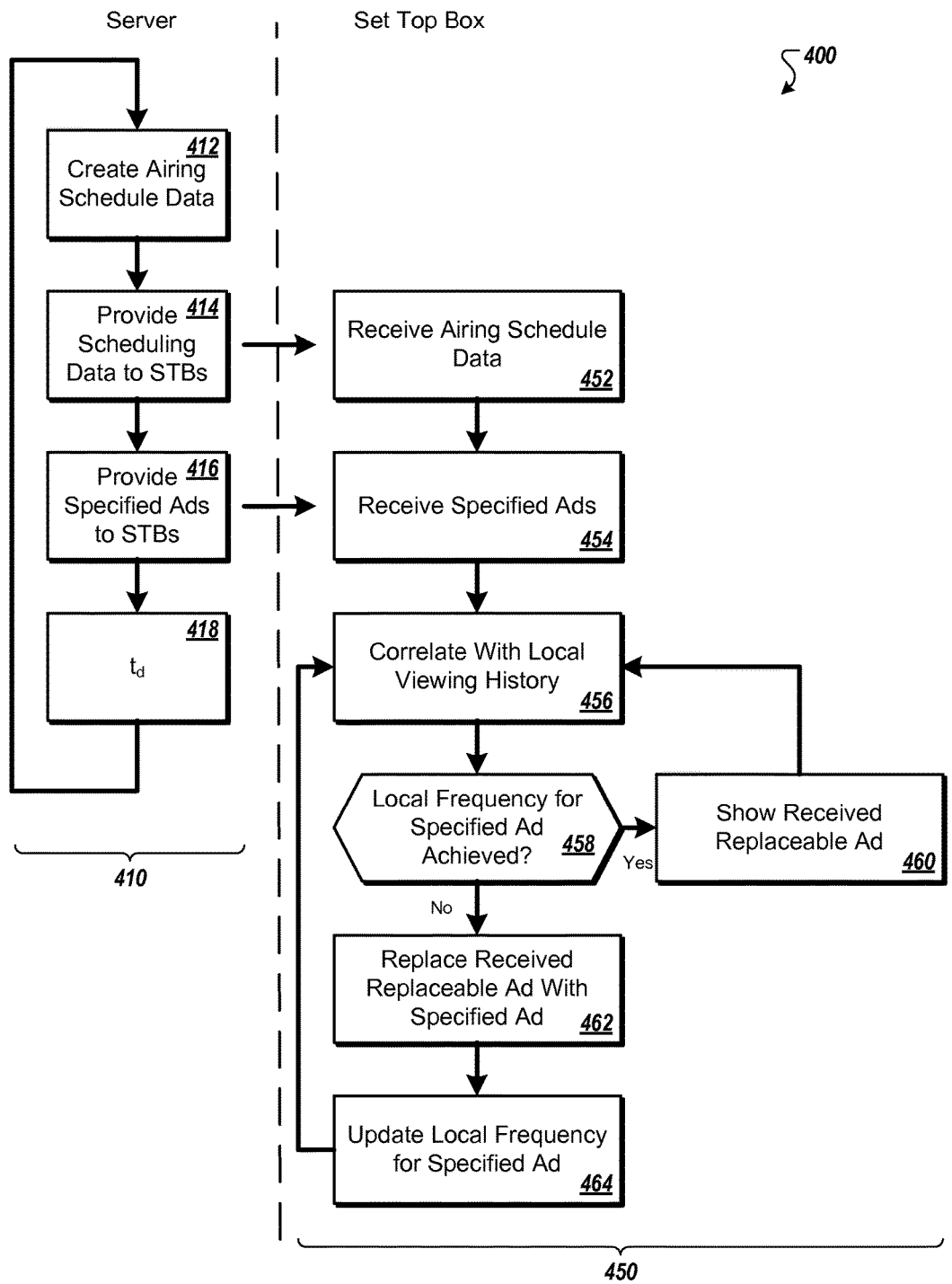
FIG. 4 is flow chart that shows an example of a process for managing reach and frequency of television advertisements.

FIG. 4 is flow chart that shows an example of a process 400 for managing reach and frequency of television advertisements. The process 400 includes a collection of operations 410 that are performed by a server computer device, such as the server computer device 120 of FIGS. 1 and 2. The process also includes a collection of operations 450 that are performed by a television processing device, such as the television processing device 104.

Among the collection of operations 410, airing schedule data is created (412) for a specified advertisement. The airing schedule data may include data specifying past airings of the specified advertisement, each past airing specifying a channel and a time of the past airing. The airing schedule data may also include a local frequency at which the specified advertisement is to be shown by use of the television processing device. In some implementations, the local frequency can be a frequency that is local relative to an identified television processing device or an identified user. For example, the local frequency may describe they frequency with which the specified advertisement 114 is to be presented by the television processing device 104. In another example, the local frequency may describe the frequency with which the specified advertisement 114 is to be presented to the user 204.

The local frequency may be inclusive of the past airings. For example, the user 204 may be identified to view the specified advertisement 114 ten times, including times that the user 204 has already seen the specified advertisement 114 within a predetermined period of time in the past (e.g., the past two days, the past week, the past month, any time in the past).

The airing schedule data may also include a schedule of airings of replaceable advertisements, each airing specifying a channel and a time of the airing. In some implementations, the schedule of airings can be received from one or more broadcasters. For example, the server computer device 120 can receive schedules from television broadcast providers, and the schedules can describe the channels and times when the replaceable advertisements 112 and 114 are scheduled to be broadcast.

The airing schedule data may be provided (414) to a set top box, such as the television processing device 104, and the airing schedule data may subsequently be received (452) by the set top box. For example, the server computer device 120 can provide airing schedule data from the airing schedule data repository 124 to the television processing device 104.

The server may also provide (416) specified advertisements to the set top box, where the specified advertisements are received (454). For example, the server computer device 120 may store the specified advertisements 112 and 114 (e.g., as digital multimedia files, multimedia data), and transmit the specified advertisements 112 and 114 to the television processing device 104. The television processing device 104 can receive the specified advertisements 112 and 114 and store or cache the specified advertisements in local memory or storage.

The server may wait (418) a predetermined period of time "td" before performing the operations 412-416 again. For example, the server computer device 120 may perform the collection of operations 410 on a periodic basis, such as once per hour, once per day, every other day, once per week, or any other appropriate periodic time interval.

The set top box may correlate (456) the airing schedule with local viewing history. For example, the television processing device 104 can compare the airing schedule 132 with the viewing log 136 to determine how many times the user 204 has already seen the specified advertisement 112.

The set top box may determine (458) if the local frequency for the specified advertisement has been achieved. For example, the television processing device 104 may determine whether or not the user 204 has seen the specified advertisement 112 at least a predetermined number of times. If the set top box determines (458) that the local frequency has not been achieved, then a received replaceable advertisement may be shown (460). For example, the television processing device 104 can receive the television broadcast 106 that includes the replaceable advertisements 110, and if the user 204 has already seen the specified advertisement 112 at least a predetermined number of times, then the television processing device 104 can present the replaceable advertisements 110 to the user 204.

If the set top box determines (458) that the local frequency has not been achieved, then the received replaceable advertisement may be replaced with a specified advertisement. The specified advertisement may be processed for airing when the set top box is tuned to the channel of the scheduled airing of the replaceable advertisement at the time of the scheduled airing. For example, the television processing device 104 can receive the television broadcast 106 that includes the replaceable advertisements 110, and if the user 204 has not already seen the specified advertisement 112 at least a predetermined number of times, then the television processing device 104 can present the specified advertisement 112 in place of at least one of the replaceable advertisements 110 to the user 204 in the modified television broadcast 140.

Although the present example may be described in terms of one specified advertisement, in some implementations multiple specified advertisements may be used. For example, the television processing device 104 may identify a collection of specified advertisements that the user 204 has not seen at least a predetermined number of times each. The received replaceable advertisement may then be replaced with any one of the collection of specified advertisements.

The local frequency for the specified advertisement may be incremented (464). For example, the television processing device 104 can determine that the user 204 has already seen the specified advertisement 112 with a local frequency of six times, and after the received replaceable advertisement has been replaced (462) and presented to the user 204, the additional presentation can cause the local frequency to be incremented to seven total views. The updated (464) local frequency may then be correlated (456) with the local viewing history and airing schedule again.

In some implementations, the airing schedule can include device identifiers, and processing the specified advertisement for airing in place of the replaceable advertisement can include processing the specified advertisement for airing in place of the replaceable advertisement only if a television processing device identifier of the television processing device matches one of the device identifiers. In some implementations, each device identifier can identify a television processing device that has been determined to be in use by a viewer that belongs to a demographic that matches a desired demographic specified for the specified advertisement.

For example, the server computer device 120 may identify that the television processing device 104 is associated (e.g., used by, owned by) the user 204, and that the user 204 may be a member of a demographic group to whom the specified advertisement 112 is to be targeted. In response to this determination, the server computer device can include an identifier of the television processing device 104 in the airing schedule 134. When the television processing device 104 determines whether to replace one of the replaceable advertisements 110 with the specified advertisement 112, the television processing device 104 can base the determination at least in part upon whether or not the television processing device 104 is identified in the airing schedule 134 in association with the specified advertisement 112.

Figure 5:
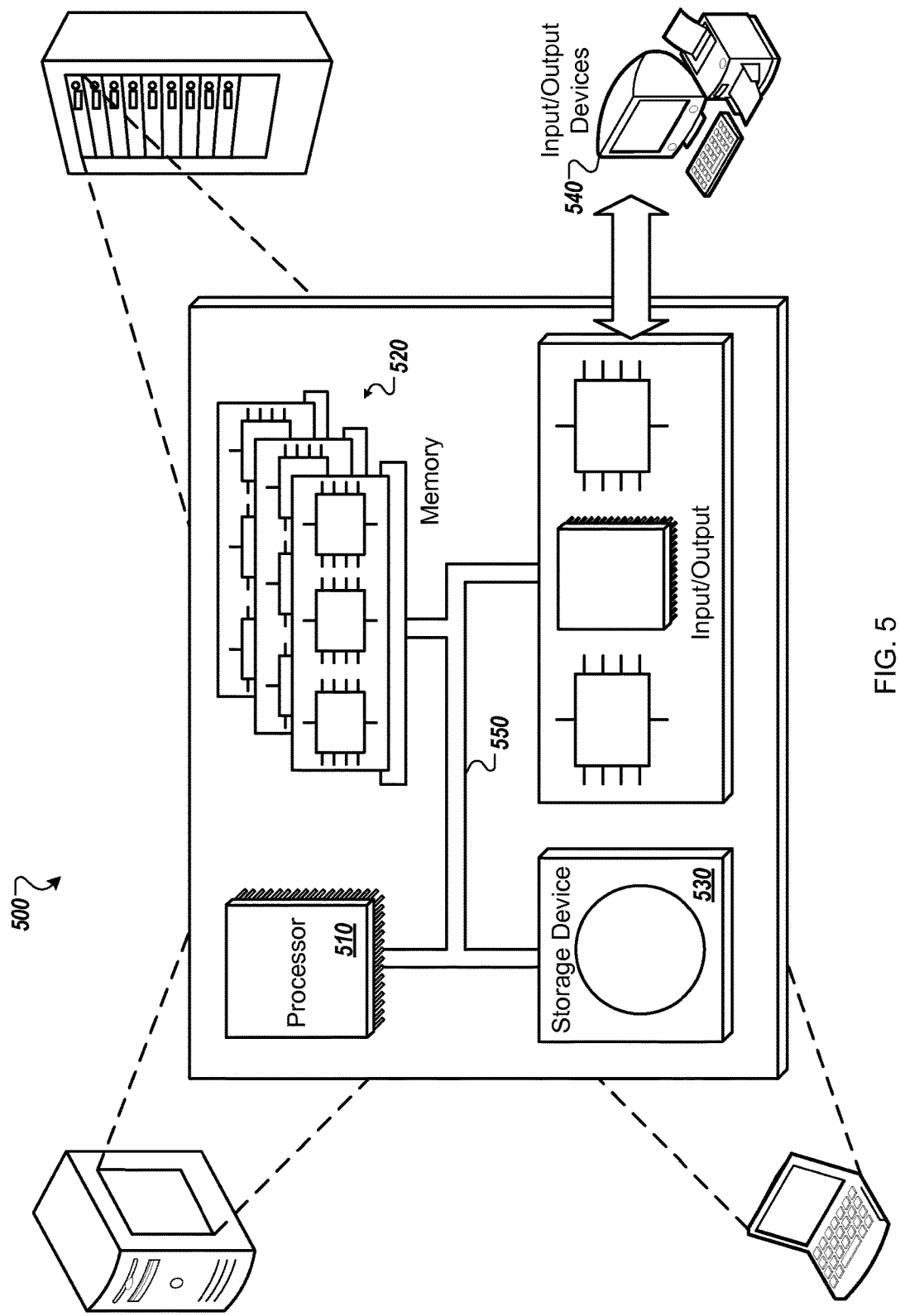
FIG. 5 is a schematic diagram of an example of a generic computer system.

FIG. 5 is a schematic diagram of an example of a generic computer system 500. The system 500 can be used for the operations described in association with the method 300 according to one implementation. For example, the system 500 may be included in either or all of the television processing device 104, the display device 102, or the server computer device 120 of FIG. 1.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   accessing, by a computer device, past airings data of advertisements specifying past airings of the advertisements, each specified past airing for each advertisement specifying a channel and a time of the past airing the advertisement during a past period of time in a television broadcast;
   determining, by the computer device, an airing schedule based on the past airings data and descriptive of past airings of the specified advertisement, each past airing specifying a channel and a time of the past airing of the specified advertisement in a television broadcast;
   receiving, by the computer device, a replaceable advertisement schedule descriptive of the timing of one or more broadcast advertisements available for replacement by the specified advertisement during the presentation of one or more television broadcasts during a future period of time, the television broadcasts including program content portions and one or more advertising content portions;
   receiving, by the computer device, data specifying an intended local frequency representing a total number of times that a specified advertisement is to be shown by use of a particular television processing device between the start of the past period of time and the end of the future period of time, the total number to be achieved by the particular television processing device based on:
   (i) a past airing count that specifies the number of times the specified advertisement was presented by the particular television processing device during the past period of time, the past airing count based in part on the airing schedule and past airings of the specified advertisement in the television broadcast during the past period of time and to be determined by the particular television processing device; and (ii) additional airings of the specified advertisement during the future period of time by the particular television processing device, in place of one or more broadcast advertisements available for replacement, based in part on the particular television processing device replacing a broadcast advertisement available for replacement as specified replaceable advertisement schedule with the specified advertisement during the future time period;
   providing, between the start of the past period of time and the end of the future period of time, by the computer device to a plurality of television processing devices:
   the airing schedule;
   the intended local frequency;
   the specified advertisement; and
   the replaceable advertisement schedule.

2. The method of claim 1, wherein each of the television processing devices:
   receives the airing schedule, the intended local frequency, the specified advertisement, and the replaceable advertisement schedule;
   determines from the airing schedule and log data of the particular television processing device the previous viewing frequency that specifies a number of times the specified advertisement was presented by the particular television processing device from the past airings of the specified advertisement;
   determines a local frequency based, in part, on the previous viewing frequency; and
   presents the specified advertisement during one or more of the advertising portions available for replacement as described by the replaceable advertisement schedule when the local frequency is less than the intended local frequency.

3. The method of claim 2, wherein determining a local frequency comprises:
   determining an additional presentation frequency that specifies the number of times the particular advertisement was presented by the television processing device by replacing a replicable advertisement; and
   summing the previous viewing frequency and the additional presentation frequency.

4. The method of claim 2, wherein determining a local frequency comprises:
   determining an additional presentation frequency that specifies the number of times the particular advertisement was presented after the past time period; and
   summing the previous viewing frequency and the additional presentation frequency.

5. The method of claim 2, further comprising:
   receiving a plurality of demographic identifiers descriptive of users associated with the particular television processing device; and
   receiving demographic target information associated with the specified advertisement, the demographic target information identifying users to whom the specified advertisement is to be presented;
   wherein the television processing device determines a correlation between a demographic identifier associated with the television processing device and the demographic target information, and presenting the specified advertisement according to the correlation.

6. A computer memory storage device storing instructions executable by a computer device and that upon such execution cause the computer device to perform operations comprising:
   accessing past airings data of advertisements specifying past airings of the advertisements, each specified past airing for each advertisement specifying a channel and a time of the past airing the advertisement during a past period of time in a television broadcast;
   determining an airing schedule based on the past airings data and descriptive of past airings of the specified advertisement, each past airing specifying a channel and a time of the past airing of the specified advertisement in a television broadcast;
   receiving a replaceable advertisement schedule descriptive of the timing of one or more broadcast advertisements available for replacement by the specified advertisement during the presentation of one or more television broadcasts during a future period of time, the television broadcasts including program content portions and one or more advertising content portions;

receiving data specifying an intended local frequency representing a total number of times that a specified advertisement is to be shown by use of a particular television processing device between the start of the past period of time and the end of the future period of time, the total number to be achieved by the particular television processing device based on:

(i) a past airing count that specifies the number of times the specified advertisement was presented by the particular television processing device during the past period of time, the past airing count based in part on the airing schedule and past airings of the specified advertisement in the television broadcast during the past period of time and to be determined by the particular television processing device; and (ii) additional airings of the specified advertisement during the future period of time by the particular television processing device, in place of one or more broadcast advertisements available for replacement, based in part on the particular television processing device replacing a broadcast advertisement available for replacement as specified replaceable advertisement schedule with the specified advertisement during the future time period;

providing, between the start of the past period of time and the end of the future period of time, to a plurality of television processing devices:
the airing schedule;
the intended local frequency;
the specified advertisement; and
the replaceable advertisement schedule.

7. The computer memory storage device of claim 6, wherein
each of the television processing devices:
receives the airing schedule, the intended local frequency, the specified advertisement, and the replaceable advertisement schedule;
determines from the airing schedule and log data of the particular television processing device the previous viewing frequency that specifies a number of times the specified advertisement was presented by the particular television processing device from the past airings of the specified advertisement;
determines a local frequency based, in part, on the previous viewing frequency; and
presents the specified advertisement during one or more of the advertising portions available for replacement as described by the replaceable advertisement schedule when the local frequency is less than the intended local frequency.

8. The computer memory storage device of claim 7, wherein determining a local frequency comprises:
determining an additional presentation frequency that specifies the number of times the particular advertisement was presented by the television processing device by replacing a replicable advertisement; and
summing the previous viewing frequency and the additional presentation frequency.

9. The computer memory storage device of claim 7, wherein determining a local frequency comprises:
determining an additional presentation frequency that specifies the number of times the particular advertisement was presented after the past time period; and
summing the previous viewing frequency and the additional presentation frequency.

10. The computer memory storage device of claim 7, further comprising:
receiving a plurality of demographic identifiers descriptive of users associated with the particular television processing device; and
receiving demographic target information associated with the specified advertisement, the demographic target information identifying users to whom the specified advertisement is to be presented;
wherein the television processing device determines a correlation between a demographic identifier associated with the television processing device and the demographic target information, and presenting the specified advertisement according to the correlation.

11. A system, comprising:
a data processing apparatus; and
a computer memory storage device storing instructions executable by a computer device and that upon such execution cause the computer device to perform operations comprising:
accessing past airings data of advertisements specifying past airings of the advertisements, each specified past airing for each advertisement specifying a channel and a time of the past airing the advertisement during a past period of time in a television broadcast;
determining an airing schedule based on the past airings data and descriptive of past airings of the specified advertisement, each past airing specifying a channel and a time of the past airing of the specified advertisement in a television broadcast;
receiving a replaceable advertisement schedule descriptive of the timing of one or more broadcast advertisements available for replacement by the specified advertisement during the presentation of one or more television broadcasts during a future period of time, the television broadcasts including program content portions and one or more advertising content portions;
receiving data specifying an intended local frequency representing a total number of times that a specified advertisement is to be shown by use of a particular television processing device between the start of the past period of time and the end of the future period of time, the total number to be achieved by the particular television processing device based on:
(i) a past airing count that specifies the number of times the specified advertisement was presented by the particular television processing device during the past period of time, the past airing count based in part on the airing schedule and past airings of the specified advertisement in the television broadcast during the past period of time and to be determined by the particular television processing device; and
(ii) additional airings of the specified advertisement during the future period of time by the particular television processing device, in place of one or more broadcast advertisements available for replacement, based in part on the particular television processing device replacing a broadcast advertisement available for replacement as specified replaceable advertisement schedule with the specified advertisement during the future time period;
providing, between the start of the past period of time and the end of the future period of time, to a plurality of television processing devices:

the airing schedule;
the intended local frequency;
the specified advertisement; and
the replaceable advertisement schedule.

12. The system of claim 11, further comprising the television processing devices, and wherein each of the television processing devices:
- receives the airing schedule, the intended local frequency, the specified advertisement, and the replaceable advertisement schedule;
- determines from the airing schedule and log data of the particular television processing device the previous viewing frequency that specifies a number of times the specified advertisement was presented by the particular television processing device from the past airings of the specified advertisement;
- determines a local frequency based, in part, on the previous viewing frequency; and
- presents the specified advertisement during one or more of the advertising portions available for replacement as described by the replaceable advertisement schedule when the local frequency is less than the intended local frequency.

13. The system of claim 12, wherein determining a local frequency comprises:
- determining an additional presentation frequency that specifies the number of times the particular advertisement was presented by the television processing device by replacing a replicable advertisement; and
- summing the previous viewing frequency and the additional presentation frequency.

14. The system of claim 12, wherein determining a local frequency comprises:
- determining an additional presentation frequency that specifies the number of times the particular advertisement was presented after the past time period; and
- summing the previous viewing frequency and the additional presentation frequency.

* * * * *